United States Patent
Kejdana et al.

(10) Patent No.: US 12,503,890 B2
(45) Date of Patent: Dec. 23, 2025

(54) MOTOR-VEHICLE LOCK

(71) Applicant: KIEKERT AG, Heiligenhaus (DE)

(72) Inventors: Aleš Kejdana, Přelouč (CZ); Jan Suk, Pardubice (CZ); Tomáš Danihelka, Přelouč (CZ)

(73) Assignee: Kiekert AG, Heiligenhaus (DE)

( * ) Notice: Subject to any disclaimer, the term of this patent is extended or adjusted under 35 U.S.C. 154(b) by 85 days.

(21) Appl. No.: 18/579,556

(22) PCT Filed: Jul. 19, 2022

(86) PCT No.: PCT/DE2022/100521
§ 371 (c)(1),
(2) Date: Jan. 16, 2024

(87) PCT Pub. No.: WO2023/006146
PCT Pub. Date: Feb. 2, 2023

(65) Prior Publication Data
US 2024/0328216 A1   Oct. 3, 2024

(30) Foreign Application Priority Data

Jul. 28, 2021 (DE) .................. 10 2021 119 634.5

(51) Int. Cl.
*E05B 83/24* (2014.01)
(52) U.S. Cl.
CPC .................. *E05B 83/24* (2013.01)
(58) Field of Classification Search
CPC ....................................................... E05B 83/24
See application file for complete search history.

(56) References Cited

U.S. PATENT DOCUMENTS 6,422,616 B1 7/2002 Wortmann
2006/0249958 A1* 11/2006 Ruckert .................. E05B 83/24
292/110

FOREIGN PATENT DOCUMENTS

| DE | 1165451 B | 3/1964 |
| DE | 3337202 A1 | 4/1985 |
| DE | 9006995 U1 | 9/1990 |
| DE | 19938687 A1 | 2/2001 |
| DE | 10148639 A1 | 5/2002 |
| DE | 102007007622 A1 | 9/2007 |
| DE | 102018119662 A1 | 2/2019 |
| KR | 20130019686 A | 2/2013 |

OTHER PUBLICATIONS

International Search Report mailed Sep. 23, 2022, for priority International Application No. PCT/DE2022/100521.

* cited by examiner

*Primary Examiner* — Kristina R Fulton
*Assistant Examiner* — Thomas L Neubauer
(74) *Attorney, Agent, or Firm* — Renner, Otto, Boisselle & Sklar, LLP

(57) ABSTRACT

A lock for a hood of a motor vehicle, having a locking mechanism with a rotary latch and at least one catch, having a lock holder, which can be brought into engagement with the locking mechanism, and having an arresting hook, wherein the arresting hook has a locking contour with a locking position and a preliminary-latching position, and wherein the arresting hook can be brought into a locking position by means of the lock holder interacting with the locking contour, wherein the locking position defines a lowered position of the arresting hook in relation to a preliminary-latching position.

13 Claims, 2 Drawing Sheets

MOTOR-VEHICLE LOCK

This application is a national phase of International Patent Application No. PCT/DE2022/100521 filed Jul. 19, 2022, which claims priority to German Patent Application No. 10 2021 119 634.5 filed Jul. 28, 2021, each of which is hereby incorporated herein by reference in its entirety.

FIELD OF DISCLOSURE

The invention relates to a lock for a hood, in particular an engine hood, of a motor vehicle, having a locking mechanism with a rotary latch and at least one catch, having a lock holder, which can be brought into engagement with the locking mechanism, and having an arresting hook, wherein the arresting hook has a locking contour with a locking position and a preliminary-latching position.

BACKGROUND OF DISCLOSURE

Hoods, engine hoods, covering hoods, and comparable locking devices on motor vehicles are provided with additional securing measures if there is a risk that the hood will open independently when the locking system is opened. Components arranged movably on the motor vehicle, such as doors, flaps or hoods, are held in their locking position by means of a locking system or lock. For this purpose, the locking systems have a locking mechanism, which is usually provided with a preliminary-latching position and a main latching position. If the locking mechanism is now unlocked by the operator of the motor vehicle, the movable component can be moved out of the locking position and opened.

If the movable component, such as preferably a hood, is subject to external influences, such as an airflow, there is a risk that the hood will open if the locking system is opened unintentionally and therefore pose a risk to the operator of the motor vehicle. In order to prevent this independent opening and to protect the operator of the motor vehicle and the passengers, so-called arresting hooks or locking hooks are used. These arresting hooks secure the hood when the locking mechanism is opened, although additional interaction with the hood lock is necessary in order to completely open the hood.

AS 1 165 451 discloses a hood or top closure for a motor vehicle with a preliminary-latching position and a secure locking position. A pivot latch interacts with a locking hook or lock holder in order to secure the hood in its locking position. After unlocking the hood lock, the lock holder moves from a secure locking position to a preliminary-latching position. The locking hook passes through a Z-shaped slot in the pivot latch and is held in a preliminary-latching position. Only after a further manual intervention in the pivot latch is it possible to completely release the hood from engagement with the pivot latch. For this purpose, the operator must manually engage an outwardly bent lug of the pivot latch and move the locking hook out of the Z-shaped slot of the pivot latch.

A further interaction between an arresting hook and a lock holder is disclosed in DE 39 34 239 A1. After a locking mechanism has been unlocked, the lock holder reaches a preliminary-latching position via a guide surface of the arresting hook, in which the lock holder secures the hood before the vehicle hood is completely opened or released. Only after a handle has been pressed again slightly against the direction of vehicle travel can a hook lug of the arresting hook be guided through a channel of the arresting hook, so that the vehicle hood is now free and can be swung up completely.

These options for securing a hood against unintentional complete opening have generally proven successful. It is now always an aim of the automotive industry to make locking systems or locks more compact in order to save installation space, which in turn has a positive effect on the design of the motor vehicle. Weight can also be saved through a more compact design, which can have a positive influence on the fuel consumption of the motor vehicle. In addition, the overall dimensions of the motor vehicle can be changed and in particular reduced, so that installation space can be created for additional functions and/or newer safety systems in the motor vehicle.

SUMMARY OF DISCLOSURE

The object of the invention is to provide an improved hood lock for a motor vehicle. In particular, it is the object of the invention to create the possibility of providing an overall more compact design when the lock holder interacts with the motor-vehicle lock.

The object is achieved by the features of independent claim 1. Advantageous embodiments of the invention are specified in the dependent claims. It should be noted that the embodiments described below are not limiting; rather, any possible variations of the features described in the description and the dependent claims are possible.

According to claim 1, the object of the invention is achieved in that a lock for a hood, in particular an engine hood, of a motor vehicle is provided, having a locking mechanism with a rotary latch and at least one catch, having a lock holder which can be brought into engagement with the locking mechanism, and having an arresting hook, wherein the arresting hook has a locking contour with a locking position and a preliminary-latching position, and wherein the arresting hook can be brought into a locking position by means of the lock holder interacting with the locking contour, wherein the locking position defines a lowered position of the arresting hook in relation to a preliminary-latching position of the arresting hook. The design of the lock according to the invention makes it possible to provide a motor-vehicle lock that requires reduced installation space in a locking position of the lock. Through the interaction of the lock holder and the arresting hook, the arresting hook can be moved into a position in which the arresting hook can be brought into a lowered position. If the arresting hook functions in a preliminary-latching position in a conventional manner such that the lock holder is in engagement with the arresting hook, the lock holder, in interaction with the locking contour, moves the arresting hook while reaching the locking position in such a way that the arresting hook is pivoted from a preliminary-latching position into a locking position. The arresting hook is pivoted out of the locking direction of the lock holder.

The lock is preferably used for a hood, in particular an engine hood. However, the design of the lock according to the invention can also be used wherever an arresting hook is used in a lock. This can include covers, for example for a convertible top, flaps for trunks or trays, just to name examples of areas of application. Arresting hooks are used where external influences can cause the hood to open independently. The use of the arresting hook on a hood in the front region of a motor vehicle is preferred. After unlocking the locking mechanism, the locking mechanism releases the lock holder so that a hood can be opened. For example, if the locking mechanism is opened unintentionally while the motor vehicle is moving, the airflow could open the hood completely. In order to prevent any risk to the operator of the motor vehicle or the passengers, the lock holder is held by the arresting hook and at least one further action is necessary in order to completely open the hood.

The locking mechanism comprises a rotary latch and at least one catch, wherein the rotary latch can be brought into engagement with the lock holder and the catch locks the rotary latch in the latching position during locking. In this case, locking mechanisms with a preliminary-latching position and a main latching position or only a main latching position are used. The main latching position of the locking mechanism defines the locking position of the hood for the proper operation of the motor vehicle. If the locking mechanism is unlocked, for example by means of an internal operating handle in the passenger compartment and via a Bowden cable that engages with the hood lock, the lock holder reaches a release position or a preliminary-latching position. In the preliminary-latching position, the arresting hook holds the lock holder and at least one further manual or electrical actuation is necessary to release the arresting hook from engagement with the lock holder. This ensures the highest level of safety in the motor vehicle.

If the arresting hook is guided by means of the lock holder, an advantageous embodiment of the invention is provided. The arresting hook is in continuous engagement with the arresting hook during the locking movement of the hood.

The arresting hook has a locking contour, via which the lock holder can move the arresting hook from an open position of the hood into a preliminary-latching position and from the preliminary-latching position into the main latching position or locking position. When reference is made here to the main latching position, the locking position or latching position of the locking mechanism is thereby meant. The locking position is the position that the arresting hook assumes in the main latching position of the locking mechanism or the locking position of the hood. The lock holder moves the arresting hook during the locking of the lock and thereby allows the arresting hook to be snapped into place or the arresting hook to be pivoted into a locking position. For this purpose, the arresting hook is mounted on an axis so as to be pivotable. The axis of the arresting hook can be a pivot axis of the rotary latch or the catch.

If the locking contour of the arresting hook has a first locking contour for inserting the lock holder, an advantageous embodiment of the invention can be achieved. The control contour can be divided on the arresting hook. A control contour serves to enable the lock holder to be inserted into the preliminary-latching position. The lock holder moves the arresting hook in a linear locking movement from the starting position about the pivot axis of the arresting hook, so that a pointed contour at one end of the first control contour enables the lock holder to fall into the preliminary-latching position. If the hood is closed carefully, i.e., at low speed, the hood only reaches the preliminary-latching position. In the preliminary-latching position, however, the hood is already secured in such a way that the motor vehicle can be used without endangering the vehicle passengers.

If the locking contour has a further control contour for pivoting the lock holder into a locking position, a further advantageous embodiment of the invention can be achieved. The arresting hook is advantageously pivoted by the first control contour and the further control contour in a corresponding direction. In particular, the further control contour ensures that the arresting hook is pivoted beyond the pivot angle to reach the preliminary-latching position, so that the part of the arresting hook for the preliminary-latching position is pivoted away from the locking direction of the lock holder. The arresting hook therefore no longer blocks movement of the lock holder. As a result, the lock holder and in particular the length of the lock holder can advantageously be shortened. This also results in shorter engagement ratios between the hood and the lock, so that an overall more compact design can be assumed. In this case, the arresting hook pivots so far out of the range of movement of the lock holder that only the control contour of the arresting hook has to be gripped by the lock holder. In other words, the lock holder merely has to grip around the control contour of the locked position in order to move the hood into the completely locked position. In the locked position, the arresting hook is pivoted out of the range of movement of the lock holder, so that the control contour for the preliminary-latching position is flush with a housing of the lock.

The arresting hook is pivotable in the locking direction by means of the further control contour. The arresting hook is pivoted about the bearing point of the arresting hook, so that the arresting hook is pivotable as far as desired away from the direction of movement of the lock holder in accordance with the length of the control contour. The arresting hook is advantageously pivoted so far out of the movable position of the lock holder that the part of the arresting hook for the preliminary-latching position is moved out of the path of movement of the lock holder. This allows the hood to be moved closer to the lock.

It can also be advantageous if the further control contour describes a circular path. A circular path in the arresting hook thereby makes it possible for the arresting hook to be pivoted out of the path of movement of the lock holder continuously and uniformly, i.e., with a defined movement. The radius of the circular path can be selected such that a pivoting movement coordinated with the locking movement can be set, so that a slight movement of the arresting hook, that is to say with optimal force ratios for pivoting the arresting hook, and with a defined speed of pivoting can be expected.

In one embodiment of the invention, the arresting hook is pivotable in a first locking direction by means of the first control contour, is pivotable in an opposite direction by means of a third control contour and in turn is pivotable in the first locking direction with the further control contour. By constructing or arranging a plurality of control contours for guiding the arresting hook, safe movement of the arresting hook can be ensured even if, for example, the arresting hook is not spring-loaded. The control contours make it possible for the arresting hook to be moved into a preliminary-latching position, a locking position and an open position when the lock holder moves, even without spring force. Advantageously, the positioning of the arresting hook is then designed such that the arresting hook moves in a first locking direction due to gravity.

In this embodiment, the arresting hook can be inserted without a spring by means of the lock holder. The control contours, in combination with the dead weight and the positioning of the arresting hook, make it possible for the lock holder to be moved through the control contours into an open position, a preliminary-latching position and a locking position.

It can also be advantageous if the arresting hook can be eccentrically positioned in the lock in relation to an insertion direction of the lock holder. The lock holder moves on a linear path of movement while being transferred to the main latching position of the locking mechanism of the lock. For this purpose, the hood is attached to the motor vehicle with hinges, whereby the lock holder is pivotable about the pivot axes of the hinges. There are motor vehicles equipped with one or two lock holders or one or two locks. In any case, the lock holder moves into the lock by means of a linear movement in the insertion direction. The insertion direction defines a center line, which also represents the reference line for an eccentric arrangement of the arresting hook in the lock. Advantageously, the bearing point of the arresting hook is eccentrically positioned in the motor-vehicle lock in a direction opposite to the direction of movement of the arresting hook when the lock holder is inserted into the preliminary-latching position. For example, starting from a center line that defines the locking direction, an arrangement of the bearing point of the arresting hook on a right side of the center line can be assumed, in which case a pivoting movement of the arresting hook to reach the preliminary-latching position carries out a pivoting movement in the counterclockwise direction via the first control contour.

Of course, a reverse arrangement is also conceivable. If this is referred to as pivoting in a counterclockwise direction, the lock holder pivots the arresting hook in the opposite direction when it reaches the arresting hook through the first control contour on the arresting hook. However, in order to snap the lock holder into the arresting hook, the arresting hook in turn snaps back in the clockwise direction at least in some regions, so that the arresting hook can grip around the lock holder and hold it securely. Preferably, the arresting hook is spring-loaded in the clockwise direction in this embodiment. As described above, the arrangement of a plurality of control contours also makes it possible to insert or release the lock holder without spring preload.

Advantageously, the arresting hook closes flush with the housing of the motor-vehicle lock in the locking position. In other words, the arresting hook does not protrude beyond the lock, so that a direct approach of the lock to the hood can be enabled. The approach of the hood to the lock is not hindered by the arresting hook, since the arresting hook has been pivoted out of the range of movement of the lock holder. This makes a compact design of the lock or the lock holder possible; in addition, the lock holder itself can have a smaller expansion and the overall weight of the lock and the lock holder can be assumed to be lower. A plurality of advantages can thus be achieved by the design of the motor-vehicle lock according to the invention in combination with the lock holder.

BRIEF DESCRIPTION OF DRAWINGS

The invention is explained in more detail below with reference to the accompanying drawings on the basis of a preferred embodiment. However, the principle applies that the exemplary embodiment does not limit the invention, but merely represents one embodiment. The features shown can be implemented individually or in combination with further features of the description as well as the claims-individually or in combination.

In the figures.

DETAILED DESCRIPTION

Figure 1:
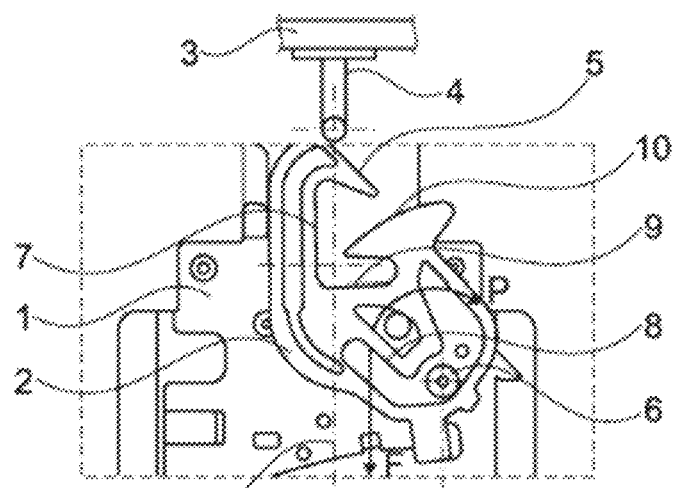
FIG. 1 shows a plan view of a motor-vehicle lock and a view of an arresting hook in a starting position before the hood has been closed.

FIG. 1 shows a basic representation of a motor-vehicle lock 1 in plan view of an arresting hook 2 and a lock holder 4 attached to a hood 3. The hood 3 is shown in an open position, so that the hood 3 is freely movable. The arresting hook 2 is in a starting position in which a first control contour 5 faces the lock holder 4. The arresting hook 2 is accommodated in the motor-vehicle lock 1 so as to be movable about a pivot axis 6. The arresting hook has a control contour 7, by means of which the lock holder can initiate a movement into the arresting hook 2. The figure shows the opened hood 3, the motor-vehicle lock 1 in an unlocked situation and the arresting hook 2 in its starting position.

The lock holder 4 moves linearly along a center line C and moves the arresting hook 2 as it moves along the center line C. The arresting hook 2 is positioned spaced at a distance A in the motor-vehicle lock 1. A center of gravity 8 of the arresting hook 2 lies between the bearing point 6 of the arresting hook 2 and the center line C. This causes gravity to act on the arresting hook, which loads the arresting hook 2 in the direction of arrow F due to its gravity F in the counterclockwise direction. A spring element (not shown) is usually arranged on the arresting hook 2, the spring element spring-loading the arresting hook 2 clockwise in the direction of arrow P. In principle, however, the arresting hook 2 can also be transferred into a preliminary-latching position and a locking position through the interaction of the control contour 7 with the lock holder 4. A first control contour 5, a further control contour 9 and a third control contour 10 can be seen in FIG. 1. In the starting position of the arresting hook 2 shown in FIG. 1, the hood is open.

Figure 2:
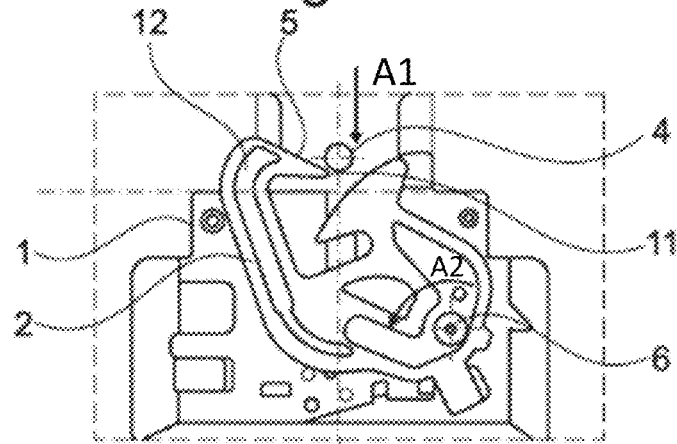
FIG. 2 shows the position of the arresting hook during the locking process before the lock holder has reached the preliminary-latching position.
Figure 3:
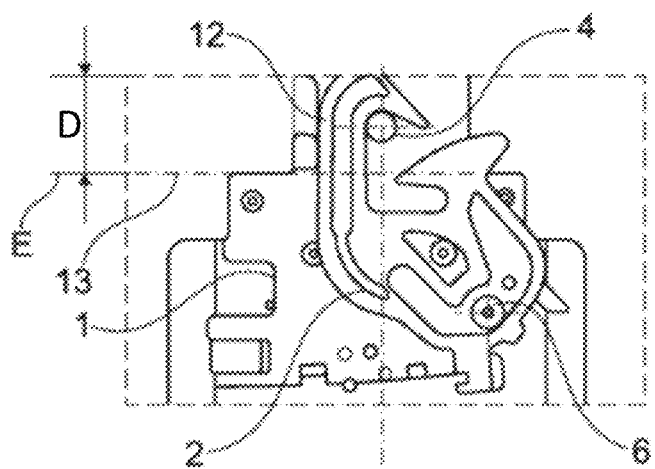
FIG. 3 shows the preliminary-latching position of the lock holder in engagement with the arresting hook.
Figure 4:
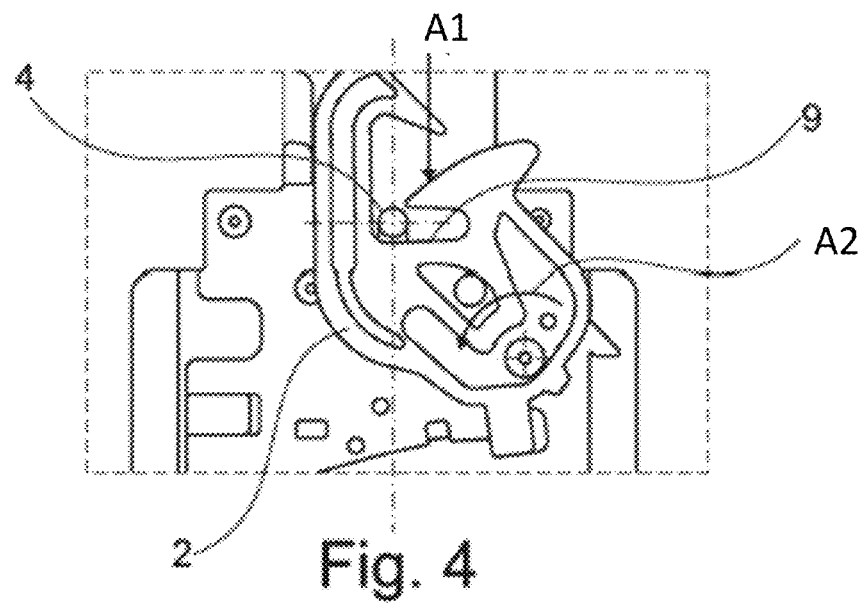
FIG. 4 shows the position of the lock holder before the lock holder has reached the locking position.

FIG. 2 now shows the position of the arresting hook 2 in which the arresting hook 2 is located when the lock holder 4 has been moved in the locking direction, that is to say in the direction of arrow A1. In this case, the lock holder 4 has moved along the first control contour 5 and moved the arresting hook 2 counterclockwise in the direction of arrow A2. Upon further movement of the lock holder 4 in the direction of arrow A1, the lock holder reaches a pointed end 11 of the arresting hook 2 and between the pointed end 11 and the third control contour 10. Either a spring preload or the third control contour 10 then moves the arresting hook 2 again clockwise in the direction of arrow P, so that if the hood 3 is not completely locked and the hood 3 subsequently springs back, the lock holder 4 can come into engagement with an upper end 12 of the arresting hook 2. As a result of the spring preload or the third control contour 10, the lock holder 4 thus reaches a preliminary-latching position, as shown in FIG. 3. Even if the hood 3 is not completely locked, the arresting hook can hold the lock holder 4 securely and ensure safe use of the motor vehicle. FIG. 3 therefore shows the preliminary-latching position of the arresting hook 2. As can clearly be seen, the arresting hook 2 protrudes beyond the motor-vehicle lock 1. The protrusion of the arresting hook 2 or the upper end 12 of the arresting hook 2 beyond an upper end 13 of the motor-vehicle lock 1 is marked with "D". In this position, the lock holder 4 is held in the preliminary-latching position by means of springs, which act, for example, on the hood 3 and/or the lock holder.

If the lock holder 4 is now moved further in the direction of arrow A1, the lock holder 4 comes into engagement with the further control contour 9. The further control contour 9 causes the arresting hook 2 in turn to be moved counterclockwise in the direction of arrow A2.

Figure 5:
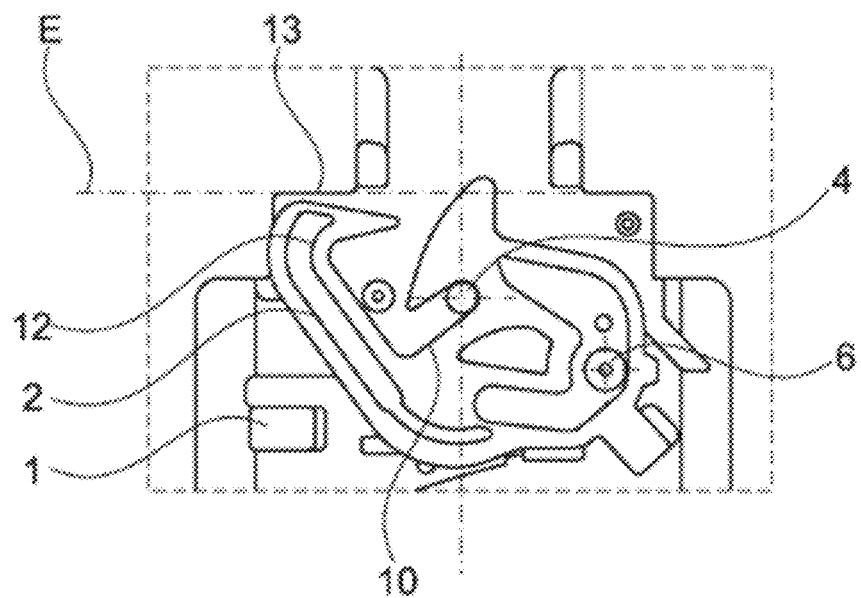
FIG. 5 shows the arresting hook in a locking position of the hood, and a main latching position of the locking mechanism.

FIG. 5 shows the position of the lock holder 4 in which the motor-vehicle lock 1 holds the lock holder 4 in a main latching position. On the one hand, the lock holder 4 is held in the main latching position and, on the other hand, the further control contour 9 arranged in a circular manner has ensured that the arresting hook 2 has been pivoted further in the direction of arrow A2, to such an extent that the upper end 12 of the arresting hook 2 is below plane E, i.e., below the upper end 13 of the motor-vehicle lock 1. The lock holder 4 can therefore be moved much closer or the hood 3 can be moved much closer to the motor-vehicle lock 1, since the upper end 12 of the arresting hook 2 is no longer in the path of movement C of the lock holder 4. The further control contour 9 has pivoted the arresting hook 2 counterclockwise to such an extent that the arresting hook or at least the upper end 12 of the arresting hook does not protrude beyond an upper end 13 of the lock. A compactly designed interaction of the lock holder 4 and the motor-vehicle lock 1 can thus be realized, which in turn has a positive effect on the constructive freedom and the design of the motor vehicle as a whole.

LIST OF REFERENCE NUMBERS

1 Motor-vehicle lock
2 Arresting hook
3 Hood
4 Lock holder
5 First control contour
6 Pivot axis
7 Control contour
8 Center of gravity
9 Further control contour
10 Third control contour
11 Pointed end
12, 13 Upper end
C Center line
A Distance
F Gravity
P, A1, A2 Arrow
D Protrusion

The invention claimed is:

1. A hood lock for a hood of a motor vehicle comprising:
a locking mechanism with a rotary latch and at least one catch,
a lock holder which is brought into engagement with the locking mechanism, and
an arresting hook, wherein the arresting hook has a locking contour with a locking position and a preliminary-latching position, wherein the arresting hook is brought into the locking position by the lock holder interacting with the locking contour, wherein the locking position is a lowered position of the arresting hook in relation to the preliminary-latching position,
wherein a bearing point of the arresting hook is eccentrically positioned with respect to a locking direction of the lock holder such that the bearing point is offset from the locking direction of the lock holder,
wherein in the preliminary-latching position, an upper end of the arresting hook extends beyond an upper end of the lock, and
wherein in the locking position, the upper end of the arresting hook is below the upper end of the lock.

2. The hood lock according to claim 1, wherein the arresting hook is guided by the interaction with the lock holder.

3. The hood lock according to claim 2, wherein the arresting hook is in continuous engagement with the arresting hook during locking movement of the hood.

4. The hood lock according to claim 2, wherein the arresting hook is pivotably mounted on a common axis with the rotary latch or the catch.

5. The hood lock according to claim 1, wherein the locking contour has a first control contour for inserting the lock holder.

6. The hood lock according to claim 5, wherein the locking contour has a further control contour for pivoting the lock holder into the locking position.

7. The hood lock according to claim 6, wherein the arresting hook is pivotable in a locking direction by the further control contour.

8. The hood lock according to claim 6, wherein the further control contour extends in a circular path.

9. The hood lock according to claim 6, wherein the locking contour has a third control contour, the arresting hook is pivotable in a first locking direction by the first control contour, is also pivotable in the first locking direction by the further control contour, and is pivotable in an opposite direction relative to the first locking direction by the third control contour.

10. The hood lock according to claim 1, wherein the arresting hook is inserted without a spring by the lock holder.

11. The hood lock according to claim 1, wherein the arresting hook is eccentrically positioned in the lock in relation to an insertion direction of the lock holder.

12. The hood lock according to claim 1, wherein the arresting hook is flush with an upper end of the motor-vehicle lock.

13. The hood lock according to claim 1, wherein the arresting hook has a center of gravity that lies between the bearing point corresponding to a pivot axis of the arresting hook and a center line of the hood lock.

* * * * *